United States Patent [19]

Inukai

[11] Patent Number: 5,903,183
[45] Date of Patent: May 11, 1999

[54] CONSTANT VOLTAGE CIRCUIT AND CONSTANT VOLTAGE/CONSTANT CURRENT CHANGEOVER CIRCUIT

[75] Inventor: Katsumi Inukai, Iwakura, Japan

[73] Assignee: Brother Kogyo Kabushiki Kaisha, Nagoya, Japan

[21] Appl. No.: 08/893,092

[22] Filed: Jul. 15, 1997

[30] Foreign Application Priority Data

Jul. 15, 1996 [JP] Japan ..................................... 8-185090

[51] Int. Cl.⁶ .............................. G05F 1/10; G03G 15/00
[52] U.S. Cl. ............................ 327/540; 399/313; 363/73; 363/97
[58] Field of Search .................................... 327/538, 540; 363/73, 97, 131; 323/370, 369; 399/313, 50, 310–314, 168–176

[56] References Cited

U.S. PATENT DOCUMENTS

| 4,727,463 | 2/1988 | Suzuki | 363/21 |
| 4,731,720 | 3/1988 | Takahashi | 363/21 |
| 5,546,172 | 8/1996 | Seto | 399/311 |
| 5,568,226 | 10/1996 | Kusano | 323/289 |
| 5,619,403 | 4/1997 | Ishikawa et al. | 363/21 |
| 5,623,330 | 4/1997 | Ishibashi | 399/310 |

*Primary Examiner*—Timothy P. Callahan
*Assistant Examiner*—Terry L. Englund
*Attorney, Agent, or Firm*—Oliff & Berridge, PLC

[57] ABSTRACT

A constant voltage circuit and a constant voltage/constant current changeover circuit hold a voltage, applied to a load, to a constant level regardless of the variation of a load current. To this end, the changeover circuit includes a first circuit with a resistor connected to the output thereof, a second circuit with a pair of resistors serially connected to the output thereof, a compensation resistor connecting one terminal of the resistor to ground, a comparison operation circuit for comparing a detection voltage supplied from the pair of resistors with a reference value, a first oscillation control circuit for controlling the first circuit based on the output from the comparison operation circuit, and a second oscillation control circuit for controlling the second circuit based on the output from the comparison operation circuit. Because a current equal in level to the load current flows in the compensation resistor, the output from the pair of resistors changes depending on the level of the load current. Therefore, the first oscillation control circuit can control the first circuit depending on the variation in the load current.

20 Claims, 6 Drawing Sheets

$$\frac{R2 \cdot R4}{R3} > R1$$

FIG. 5 (b)

$$\frac{R2 \cdot R4}{R3} = R1$$

FIG. 5 (c)

$$\frac{R2 \cdot R4}{R3} < R1$$

FIG. 6

CONSTANT VOLTAGE CIRCUIT AND CONSTANT VOLTAGE/CONSTANT CURRENT CHANGEOVER CIRCUIT

BACKGROUND OF THE INVENTION

1. Field of the Invention

The present invention relates to a constant voltage circuit having a resistor circuit in a closed loop formed by connecting the output terminal and a load. The invention also relates to a constant voltage/constant current changeover circuit having a common output terminal for outputting a constant voltage and a constant current, wherein a constant voltage output section is connected through a resistor to an output terminal.

2. Description of the Prior Art

In electrophotographic image forming devices, such as a laser beam printer, copying machine and facsimile device, a photosensitive drum and a transfer roller are disposed in confrontation with each other with a sheet passage therebetween. In forming an image on a recording sheet, a toner image formed on the surface of the photosensitive drum is transferred onto the recording sheet. This is done by applying forward bias voltage (transferring bias voltage) between the photosensitive drum and the transfer roller. After the recording sheet has passed through a gap between the photosensitive drum and the transfer roller, reverse bias voltage (cleaning bias voltage) is applied between the photosensitive drum and the transfer roller to return the residual toner on the transfer roller back to the photosensitive drum.

More specifically, when transferring the toner image onto the recording paper, transferring bias voltage is applied between the photosensitive drum and the transferring roller so that the former is at a ground potential and the latter is at a negative potential. When returning the residual toner back to the photosensitive drum, cleaning bias voltage is applied so that the transferring roller is at positive potential. The photosensitive drum is maintained at the ground potential. A constant current control is executed to apply the transferring bias voltage to uniformly transfer the electrically charged toner particles. On the other hand, a constant voltage control is executed to apply the cleaning bias voltage.

Figure 1:
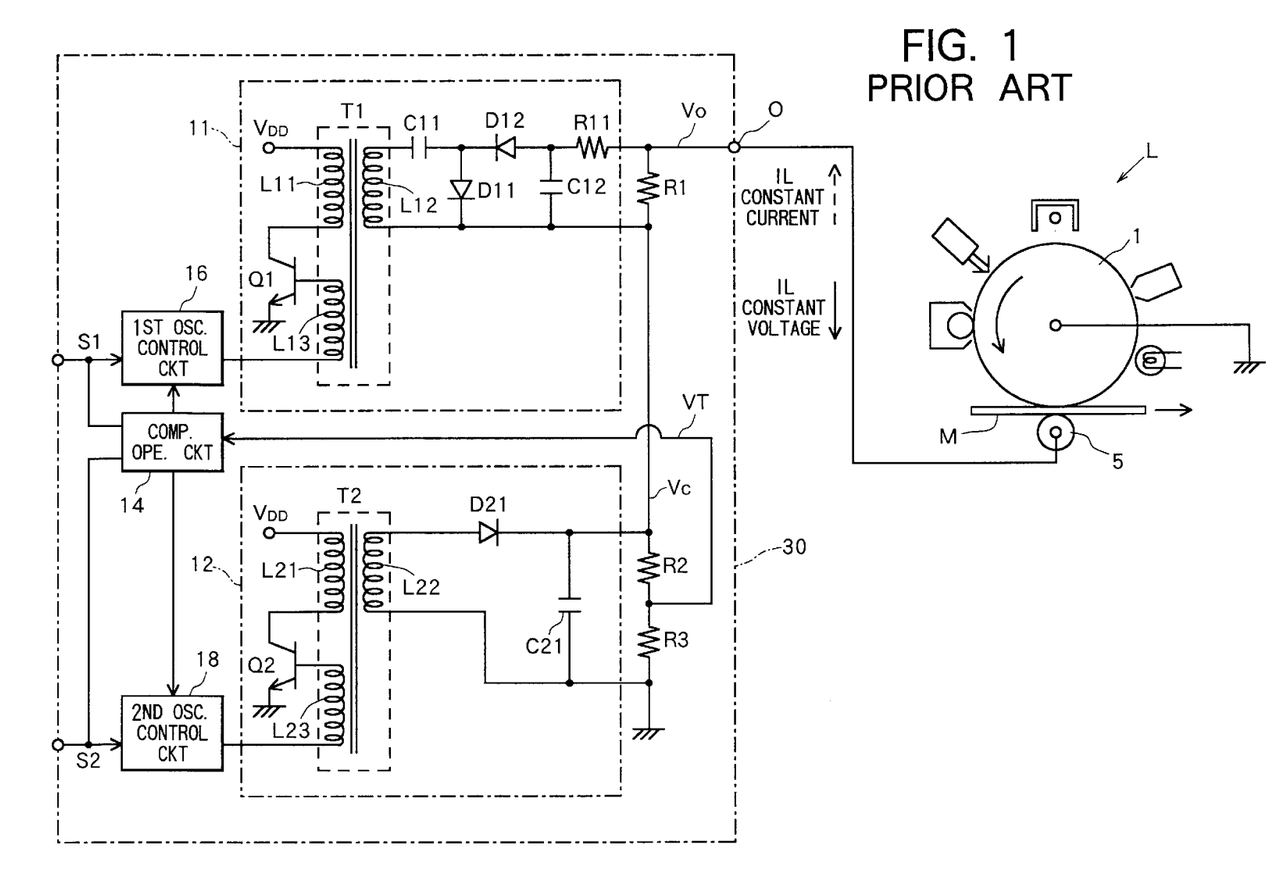
FIG. 1 is a circuit diagram showing a conventional constant voltage/constant current changeover circuit for use in an image forming device.

FIG. 1 shows a conventional constant voltage/constant current changeover circuit 30 which can selectively output the transferring bias voltage and cleaning bias voltage to be applied between the photosensitive drum and the transferring roller through the common output terminals. The circuit 30 includes a first circuit 11, a second circuit 12, a resistor R1 connected between the outputs of the first circuit 11, a pair of voltage division resistors R2 and R3 connected in series between the outputs of the second circuit 12, a comparison operation circuit 14, a first oscillation control circuit 16 and a second oscillation control circuit 18. The first circuit 11 is capable of controlling an output voltage. The second circuit 12 is capable of controlling an output current. A voltage VT developed across the resistor R3 is applied to the comparison operation circuit 14 which compares the voltage VT with a reference value. An output from the comparison operation circuit 14 is applied to both the first and second oscillation control circuits 16 and 18. The first oscillation control circuit 16 controls the first circuit 11 in accordance with the output from the comparison operation circuit 14. The second oscillation control circuit 18 controls the second circuit 12 in accordance with the output from the comparison operation circuit 14.

The high voltage output terminals of the first and second circuits 11 and 12 are connected, and the low voltage output terminal of the first circuit 11 is connected through an output terminal O to the transfer roller 5. The low voltage output terminal of the second circuit 12 is connected to ground as is the case in the photosensitive drum 1. Hereinafter, the photosensitive drum 1 and the transfer roller 5 will be referred to as "a load L".

The first circuit 11 includes a transformer T1, a transistor Q1, and a voltage doubling/rectifying circuit configured by capacitors C11 and C12, diodes D11 and D12, and a resistor R11. The transformer T1 consists of a primary winding L11, a secondary winding L12, and an auxiliary winding L13. The transistor Q1 has a bass connected to one terminal of the auxiliary winding L13, an emitter connected to ground, and a collector connected through the primary winding L11 to a voltage source VDD which supplies 24 volts in this instance. The transistor Q1, the auxiliary winding L13 and the first oscillation control circuit 16 form a blocking oscillation circuit which is well known in the art. Depending on the operation condition of the transistor Q1, the current does not flow or flows in the primary winding L11. The voltage doubling/rectifying circuit is also well known in the art, which rectifies the current flowing in the secondary winding L12 and also doubles the voltage developed across the secondary winding L12.

The second circuit 12 includes a transformer T2, a transistor Q2, and a half-wave rectifying circuit configured by a diode D21 and a capacitor C21. The transformer T2 consists of a primary winding L21, a secondary winding L22, and an auxiliary winding L23. The transistor Q2 has a base connected to one terminal of the auxiliary winding L23, an emitter connected to ground, and a collector connected through the primary winding L21 to the voltage source VDD. The transistor Q2, the auxiliary winding L23 and the second oscillation control circuit 18 form a blocking oscillation circuit similar to that provided in association with the first circuit 11. Depending on the operation condition of the transistor Q2, the current does not flow or flows in the primary winding L21. The half-wave rectifying circuit rectifies and smoothens the current flowing in the secondary winding L22.

The first oscillation control circuit 16 operates only when a selection signal S1 is applied thereto. Similarly, the second oscillation control circuit 18 operates only when a selection signal S2 is applied thereto. When the voltage developed across the resistor R3 is greater than the reference value set in the comparison operation circuit 14, the first and second oscillation control circuits 16 and 18 prolong the oscillation periods in the respective blocking oscillation circuits. Conversely, when the voltage developed across the resistor R3 is smaller than the reference value set in the comparison operation circuit 14, the first and second oscillation control circuits 16 and 18 shorten the oscillation periods in the respective blocking oscillation circuits. Electric power supplied to the secondary windings L12 and L22 is therefore changed so that the detection voltage VT is brought into coincidence with the reference value.

The comparison operation circuit 14 can change the reference value to be compared with the detection voltage VT depending on the selection signals S1 and S2.

The constant voltage/constant current changeover circuit 30 forms a constant current circuit as shown in FIG. 2(a) when the selection signal S1 is applied to the first oscillation control circuit 16, causing the first circuit 11 to operate and the second circuit 12 not to operate. In this case, no current flows in the second circuit 12 due to rectification of the diode D21. The constant current circuit shown in FIG. 2(a)

includes the first circuit 11, comparison operation circuit 14, oscillation control circuit 16 and resistors R1 through R3. A current equal to a load current IL flows in the resistor R3. Hence, the detection voltage VT that is proportional to the load current IL in developed in the resistor R3. Accordingly, the load current IL is maintained constant due to the control of the first oscillation control circuit 16.

Figure 2:
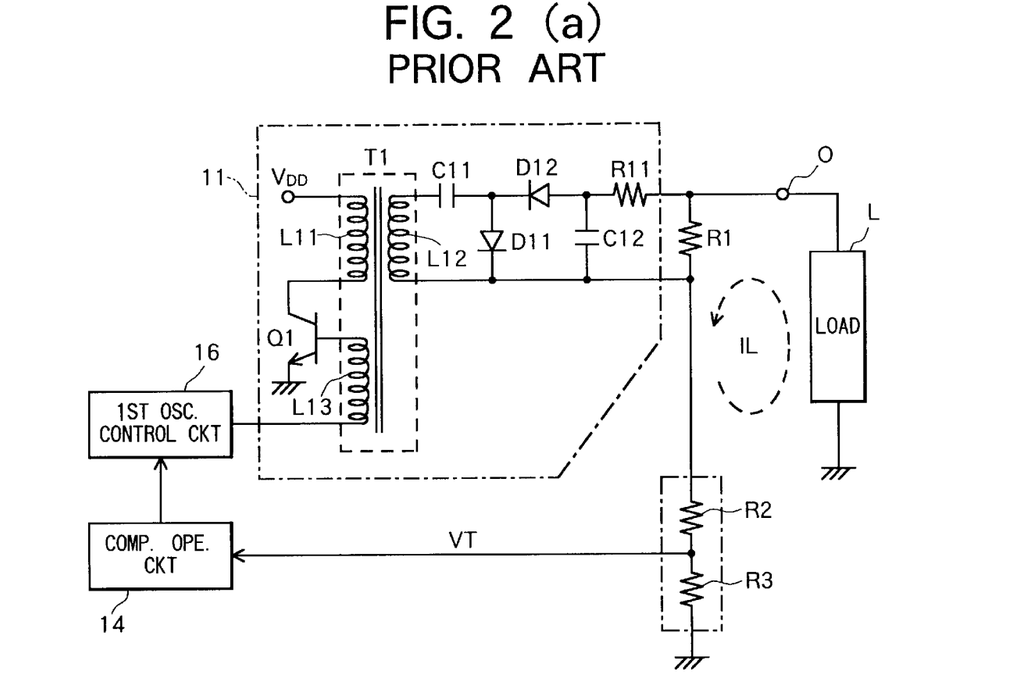
FIG. 2(a) is an equivalent circuit when the circuit shown in FIG. 1 is operating as a constant current circuit.
FIG. 2(b) is an equivalent circuit when the circuit shown in FIG. 1 is operating as a constant voltage circuit.

On the other hand, when the selection signal S2 is applied to the second oscillation control circuit 18, the first circuit 11 does not operate but the second circuit 12 operates. In this case, due to the rectification of the diodes D11 and D12, no current flows in the first circuit 11. Accordingly, a constant voltage circuit as shown in FIG. 2(*b*) is provided. The constant voltage circuit shown therein includes the second circuit 12, comparison operation circuit 14, second oscillation control circuit 18 voltage division resistors R2 and R3. That is, a detection voltage VT proportional to the output voltage Vc output from the second circuit 12 is obtained, the output voltage Vc of the second circuit 12 becomes constant due to the control of the second oscillation control circuit 18.

However, the voltage Vc output from the second circuit 12 is applied to the load L through the resistor R1, causing a voltage drop (R1×IL) therein. This results in variation in the voltage applied to the load L depending on the load current IL. The voltage VO applied to the load L is given by the following equation.

$$VO=Vc-R1\times IL \qquad (1)$$

The variation in the voltage VO can be suppressed during the constant voltage operation if the resistor R1 with a small resistance is used. However, the small resistance increases Ohmic dissipation during the constant current operation. Therefore, the resistance of resistor R1 should not be so small.

The above-noted problem exists not only in the constant voltage/constant current changeover circuit 30 of the type in which the constant voltage output and a constant current output are applied through the common terminal but also in a constant voltage circuit configured as shown in FIG. 2(*b*). Because if a resistive element is present on a line connecting the output of the constant voltage circuit to the load L, the voltage VO applied to the load L will vary depending on the load current IL.

Figure 3:
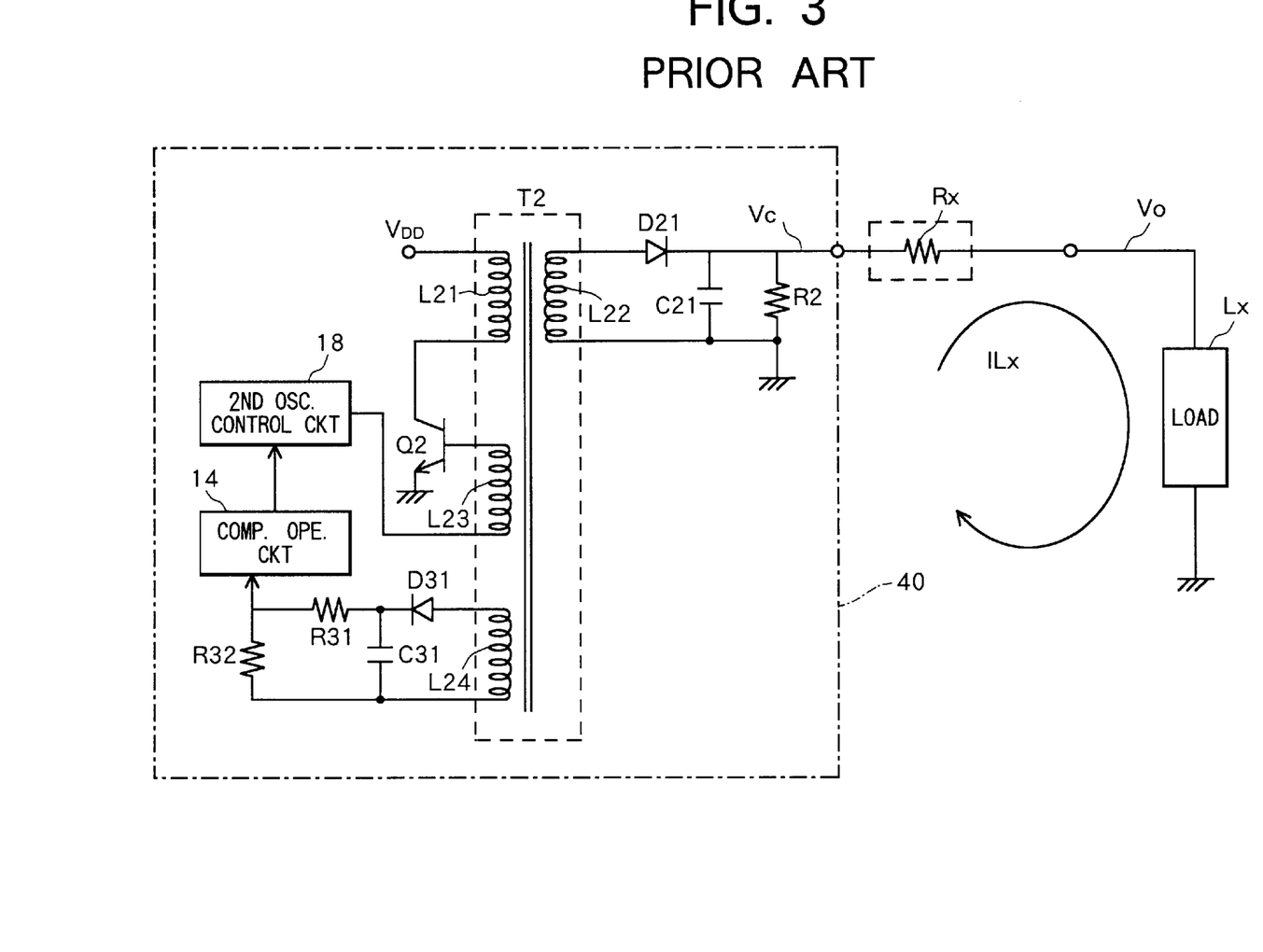
FIG. 3 is a circuit diagram showing another conventional constant voltage circuit.

FIG. 3 shows a conventional constant voltage circuit 40. The circuit shown therein differs from the circuit shown in FIG. 2(*b*) in that in lieu of inputting the output of the secondary winding L22 to the comparison operation circuit 14, a second auxiliary winding L24 is provided in the transformer T2. In addition, a half-wave rectifying circuit consisting of a diode D31 and a capacitor C31, and and voltage division resistors for voltage dividing the output of the half-wave rectifying circuit are connected to the second auxiliary winding L24. The output obtained from the resistors R31 and R32 is applied to a comparison operation circuit 14 as a detection voltage VT. This constant voltage circuit 40 thus configured can only set the voltage Vc developed between the two terminals of the secondary winding L22 to a constant value. However, if a resistor circuit Rx is interposed in the line for applying the output of the constant voltage circuit 40 to the load Lx, the voltage VO applied to the load Lx varies depending on the load current Ilx, so that the voltage VO applied to the load Lx cannot be made constant.

SUMMARY OF THE INVENTION

The present invention has been made to solve the aforementioned problems, and accordingly it is an object of the present invention to provide a constant voltage circuit that is capable of making the voltage applied to a load constant regardless of variation in a load current.

Another object of the present invention is to provide a constant voltage/constant current changeover circuit that is also capable of making the voltage applied to a load constant regardless of variation in a load.

To achieve the above and other objects, there is provided a constant voltage circuit that includes a transformer, a switching element, a rectifier, a pair of output terminals, a pair of voltage division resistors, a control circuit, a resistor circuit, and a compensation resistor. The transformer has a primary winding and a secondary winding. The switching element is connected to the primary winding of the transformer and interrupts a current flowing in the primary winding. The current flowing therein is periodically interrupted at a frequency or at a duty ratio defined by a duration of time at which the current flowing therein is interrupted per one period. The rectifier rectifies a current induced in the secondary winding of the transformer. The pair of output terminals has a first terminal and a second terminal, across which an output of the rectifier is developed. The pair of voltage division resistors consists of a first voltage division resistor and a second voltage division resistor connected across the first terminal and the second terminal. The pair of voltage division resistors voltage divides a voltage developed thereacross and outputs a detection voltage. The control circuit controls the frequency at which the switching element interrupts the current flowing in the primary winding of the transformer or the duty ratio so that the detection voltage is maintained at constant. The resistor circuit is connected between the first terminal and a load in a closed loop which is formed by connecting the pair of output terminals to the load. The compensation resistor is connected between the second terminal and the load.

The first terminal of the pair of output terminals is higher in voltage than the second terminal of the pair of output terminals. The compensation resistor has a first terminal connected to the second terminal of the pair of output terminals and a second terminal connected to ground. The load has a first terminal connected to the resistor circuit and a second terminal connected to ground.

The compensation resistor has a resistance value that is determined so that a resistance ratio of the resistor circuit to the compensation resistor is equal to a resistance ratio of the first voltage division resistor to the second voltage division resistor. The first voltage division resistor has a first terminal connected to the first terminal of the pair of output terminals and a second terminal. The second voltage division resistor has a first terminal connected to the second terminal of the first voltage division resistor and a second terminal connected to the compensation resistor.

According to another aspect of the invention, there is provided a constant voltage/constant current changeover circuit that includes a constant current circuit, a constant voltage circuit, a connection line, an output terminal, first through fourth resistors, and a control circuit. The constant current circuit includes a first transformer having a primary winding and a secondary winding, a first switching element that periodically interrupts a current flowing in the primary winding of the first transformer, a first rectifier that rectifies a current induced in the secondary winding of the first transformer, and a first pair of output terminals having a first terminal and a second terminal, across which a constant current is output. The constant voltage circuit includes a second transformer having a primary winding and a secondary winding, a second switching element that periodically interrupts a current flowing in the primary winding of the second transformer, a second rectifier that rectifies a current induced in the secondary winding of the second transformer, and a second pair of output terminals having a first terminal and a second terminal, across which a constant voltage is output. The connection line connects the second terminal of the first pair of output terminals and the first terminal of the second pair of output terminals. The output terminal provides an output representative of a signal on the first terminal of the first pair of output terminals and an output representative of a signal on the second terminal of the second pair of output terminals. The first resistor is connected across the first terminal and the second terminal of the first pair of output terminals. The second resistor and a third resistor are serially connected across the first terminal and the second terminal of the second pair of output terminals. The control circuit is provided to select either one of the first switching element and the second switching element to selectively operate only one of the constant current circuit and the constant voltage circuit. The control circuit controls the first switching element and the second switching element so that a voltage at a node between the second resistor and the third resistor is maintained constant. The fourth resistor is connected between the second terminal of the second pair of output terminals and a load.

More specifically, the first terminal of the first pair of output terminals is lower in voltage than the second terminal of the first pair of output terminals, and the first terminal of the second pair of output terminals is higher in voltage than the second terminal of the second pair of output terminals. The fourth resistor has a first terminal connected to the second terminal of the second pair of output terminals and a second terminal connected to ground. The load has a first terminal connected to the first terminal of the first pair of output terminals, and a second terminal connected to ground.

The fourth resistor has a resistance value that is determined so that a resistance ratio of the first resistor to the fourth resistor is equal to a resistance ratio of the second resistor to the third resistor. The second resistor has a first terminal connected to the first terminal of the second pair of output terminals and a second terminal, and the third resistor has a first terminal connected to the second terminal of the second resistor and a second terminal connected to the fourth resistor.

Preferably, the load is a photosensitive drum having a surface on which toner images are formed, and a transfer roller disposed in a confronting relation with the photosensitive drum with a recording medium therebetween. The constant current circuit is operated when the photosensitive drum transfers the toner images onto the recording medium, and the constant voltage circuit is operated when toner particles remaining on the transfer roller are cleaned.

BRIEF DESCRIPTION OF THE DRAWINGS

The particular features and advantages of the invention as well as other objects will become apparent from the following description taken in connection with the accompanying drawings, in which.

DETAILED DESCRIPTION OF THE PREFERRED EMBODIMENT

A preferred embodiment of the present invention will be described while referring to the accompanying drawings.

Figure 4:
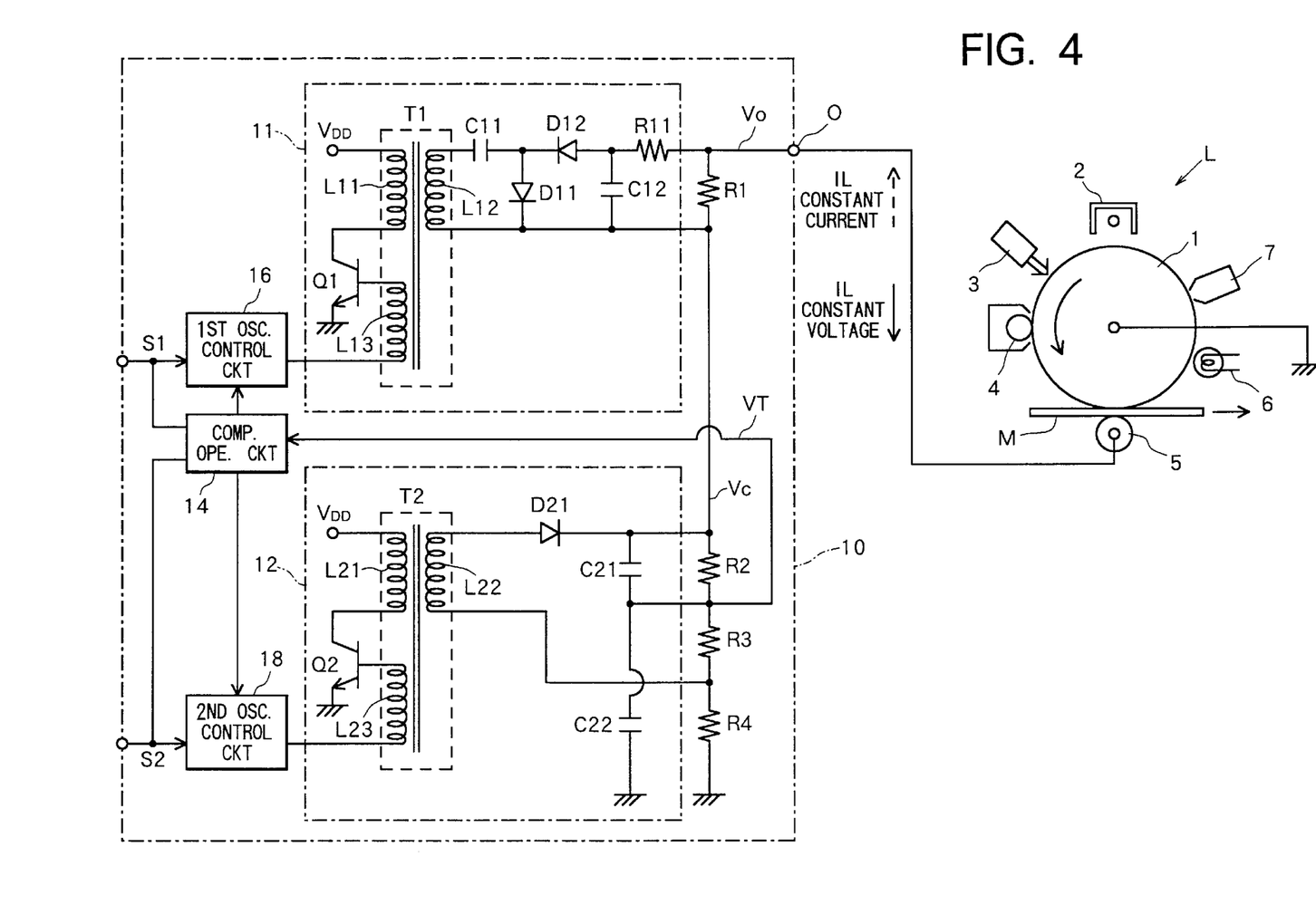
FIG. 4 is a circuit diagram showing a constant voltage/constant current changeover circuit for use in an image forming device according to an embodiment of the present invention.

FIG. 4 schematically shows a printer engine of a laser printer which carries out printing on a recording medium. FIG. 4 also shows a circuit diagram showing a constant voltage/constant current changeover circuit that generates biases for controlling toner image transfer.

As shown in FIG. 4, the printer engine L includes a photosensitive drum 1 which is rotatable in a counterclockwise direction as shown by an arrow. Toner images are formed on the peripheral surface of the photosensitive drum 1 and transferred onto a recording medium M, such as a sheet of paper. A corona charger 2, an exposing unit 3, a developing unit 4, a transfer roller 5, a discharging lamp 6, and a toner cleaner 7 are disposed in the stated order along the outer periphery of the drum 1 in a direction in which the drum 1 rotates. The corona charger 2 uniformly charges the peripheral surface of the photosensitive drum 1. The exposure unit 3 irradiates laser light onto the surface of the drum 1 based on image data supplied from a controller (not shown) to form electrostatic latent images on the surface of the drum 1. The developing unit 4 supplies toner particles to the surface of the photosensitive drum 1 to form toner images corresponding to the latent images. The transferring roller 5 transfers the toner image onto the recording medium M. The discharging lamp 6 discharges the electrical charges remaining on the photosensitive drum 1 after transferring. The toner cleaner 7 cleans the residual toner particles on the surface of the drum 1.

A constant voltage/constant current changeover circuit 10 is connected between the photosensitive drum 1 which is grounded and the transfer roller 5. The changeover circuit 10 applies a negative voltage to the transfer roller 5 when the toner image is transferred onto the transfer roller 5. At this time, a constant current controlled transferring bias is applied between the photosensitive drum 1 and the transferring roller 5 (hereinafter referred to as "a load L"). On the other hand, when the residual toner particles on the transfer roller 5 are returned to the photosensitive drum 1 after passage of the recording medium M, the circuit 10 applies a positive voltage to the transfer roller 5 and a constant voltage controlled cleaning bias is applied to the load L.

The constant voltage/constant current changeover circuit 10 of this embodiment has an improved arrangement over the conventional circuit 30 shown in FIG. 1. Specifically, the circuit 10 of this embodiment differs from the conventional circuit 30 in that the low voltage output of the second circuit 12 is not directly connected to ground but grounded through a compensation resistor R4. Also, the capacitors C21 and C22 that perform smoothing of the output rectified by the diode D21 are connected In such a manner that the capacitor C21 is connected in parallel to the resistor R2 and another capacitor C22 is connected at one end to the node between the resistors R2 and R3 and at the other end to ground.

Accordingly, when the selection signal S1 is input to apply the transfer bias to the load L and when the circuit is operating in a constant current mode, the detection voltage VT increases by the voltage drop in the compensation resistor R4 connected in series to the voltage division resistors R2 and R3. The circuit 30 differs from the conventional circuit 10 in the above respect.

On the other hand, when the selection signal S2 is input to apply the cleaning bias to the load L and when the circuit 10 is operating in the constant voltage mode, the load current IL also flows in the compensation resistor R4. Therefore, as the load current IL increases, the potential at the lower voltage side output in the second circuit 12 lowers below the ground potential, causing to lower the detection voltage VT in comparison with the detection voltage generated under the same situation in the circuit of FIG. 1. As a result, the output voltage of the second circuit 12 increases depending on the increase in the load current IL.

Representing the output voltage in the high voltage side output in the second circuit 12 relative to the ground potential as Vc, the output voltage at the output terminal O, that is, the voltage VO applied to the load L is given by the above-noted equation (1) and the detection voltage VT is given by the following equation.

$$VT=(Vc+R4\times IL)\times R3/(R2+R3)-R4\times IL=(R3\times Vc-R2\times R4\times IL)/(R2+R3) \qquad (2)$$

The output voltage Vc from the second circuit 12 can be given by the following equation by rewriting equation (2).

$$Vc=\{(R2+R3)/R3\}\times Vt+\{R2\times R4/R3\}\times IL \qquad (3)$$

Substituting equation (3) into equation (1), the voltage VO applied to the load L can be given by the following equation.

$$VO=\{(R2+R3)/R3\}\times Vt+[\{R2\times R4/R3\}-R1]\times IL \qquad (4)$$

Referring to the second term at the right side of equation (4), by setting the resistance value of the compensation resistor R4 to satisfy the following relation, the coefficient of the load current IL becomes a positive value.

$$R2\times R4/R3>R1, \text{ that is, } R2/R3>R1/R4$$

Figure 5:
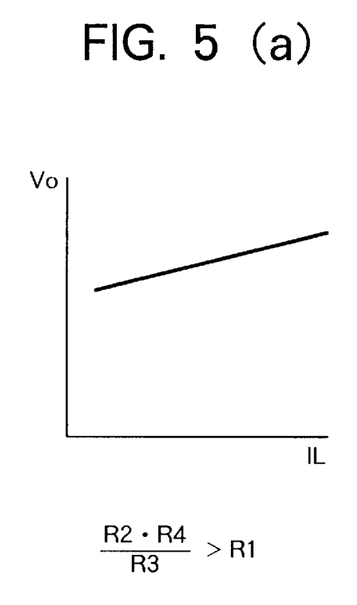
FIGS. 5(a) through 5(c) are graphical representation for illustrating operation of the circuit shown in FIG. 4.

Therefore, as shown in FIG. 5(a), the voltage VO applied to the load L increases depending on the load current IL.

When the resistance value of the compensation resistor R4 is set to satisfy the following relation, the coefficient of the load current IL becomes zero.

$$R2\times R4/R3=R1, \text{ that is, } R2/R3=R1/R4$$

Therefore, as shown in FIG. 5(b), the voltage VO applied to the load L is constant regardless of the level of the load current IL.

Further, when the resistance value of the compensation resistor R4 is set to satisfy the following relation, the coefficient of the load current IL becomes a negative value.

$$R2\times R4/R3<R1, \text{ that is, } R2/R3<R1/R4$$

Therefore, as shown in FIG. 5(c), the voltage VO applied to the load L decreases depending upon the load current IL.

As described above, according to the changeover circuit 10 of this embodiment, the resistance value of the compensation resistor is selected so that a resistance ratio of the resistor R2 to R3 is equal to the resistance ratio of the resistor R1 to resistor R4. With the use of such compensation resistor, the voltage applied to the load L can be maintained constant during the constant voltage operation regardless of the variation in the load current IL. Further, by setting the resistance value of the compensation resistor R4 to an appropriate value, the voltage VO applied to the load L during the constant voltage operation can be increased or decreased at a desired rate depending upon the load current. As such, the voltage VO applied to the load L can be set to an appropriate value depending on the characteristics of the load L.

Next, a constant voltage circuit according to a second embodiment of the present invention will be described.

Figure 6:
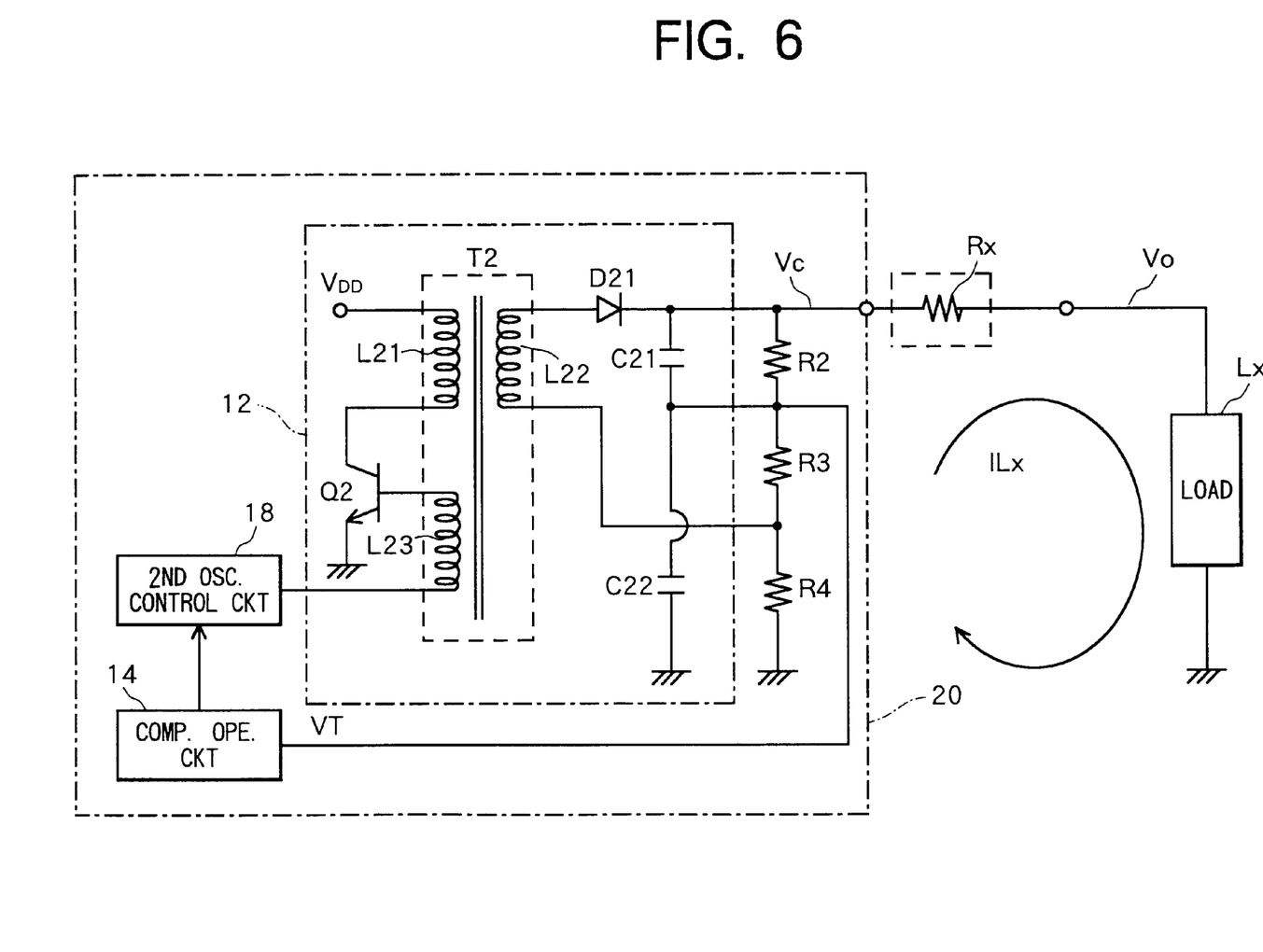
FIG. 6 is a circuit diagram showing a constant voltage circuit according to another embodiment of the present invention.

As shown in FIG. 5, the constant voltage circuit 20 according to the second embodiment is configured based on the changeover circuit 10 according to the first embodiment and by removing the first circuit 11, oscillation control circuit 16, and the resistor R1 and also by connecting the high voltage side output of the second circuit 12 to the output terminal O. The constant voltage circuit 20 is used by interposing a resistor circuit Rx in the line for supplying an output to the load Lx. As such, by replacing the resistor circuit Rx with the resistor R1, the circuit shown in FIG. 6 is equivalent to the circuit of the first embodiment when the latter circuit is in the constant voltage operating mode, and therefore the two circuits operate in the same manner.

According to the constant voltage circuit 20 of the second embodiment, the resistance value of the compensation resistor R4 is set so that the resistance ratio of the resistor R2 to R3 is equal to the resistance ratio of the resistor circuit to the compensation resistor R4, the voltage VO applied to the load L can be maintained constant regardless of the load current ILx. Further, by setting the resistance of the compensation resistor R4 to an appropriate value, the voltage VO applied to the load Lx can be increased or decreased at a desired ratio depending on the load current ILx.

While two exemplary embodiments of this invention have been described in detail, those skilled in the art will recognize that there are many possible modifications and variations which may be made in these exemplary embodiments while yet retaining many of the novel features and advantages of the invention. For example, in the above-described embodiments, the transfer bias was set so that the transfer roller is at the negative potential relative to the potential in the photosensitive drum and the cleaning bias was set so that the transfer roller is at the positive potential relative to the potential in the photosensitive drum. However, the polarities of these biases may be opposite to those described above. The polarities thereof are set depending on the charged polarity of the toner particles and also the printing conditions of the devices.

What is claimed is:

1. A constant voltage circuit comprising:
   a transformer having a primary winding and a secondary winding;
   a switching element that interrupts a current flowing in said primary winding of said transformer at a frequency;
   a rectifier that rectifies a current induced in said secondary winding of said transformer;
   a pair of output terminals having a first terminal and a second terminal, across which an output of said rectifier is developed;
   a pair of voltage division resistors consisting of a first voltage division resistor and a second voltage division resistor connected across said first terminal and said second terminal, said pair of voltage division resistors voltage dividing a voltage developed thereacross and outputting a detection voltage;

a control circuit that controls the frequency at which said switching element interrupts the current flowing in said primary winding of said transformer so that the detection voltage helps maintain a constant output voltage to a load;

a resistor circuit connected between the first terminal and the load in a closed loop formed by connecting said pair of output terminals to the load; and a compensation resistor connected between the second terminal and the load wherein said compensation resistor has a resistance value that is a function of said resistor circuit and said pair of voltage division resistors.

2. The constant voltage circuit according to claim 1, wherein said first terminal of said pair of output terminals is higher in voltage than said second terminal of said pair of output terminals.

3. The constant voltage circuit according to claim 2, wherein said compensation resistor has a first terminal connected to the second terminal of said pair of output terminals and a second terminal connected to ground.

4. The constant voltage circuit according to claim 3, wherein the road has a first terminal connected to said resistor circuit and a second terminal connected to ground.

5. The constant voltage circuit according to claim 1, wherein said resistance value of said compensation resistor is determined so that a resistance ratio of said resistor circuit to said compensation resistor is equal to a resistance ratio of said first voltage division resistor to said second voltage division resistor.

6. The constant voltage circuit according to claim 5, wherein said first voltage division resistor has a first terminal connected to the first terminal of said pair of output terminals and a second terminal, and wherein said second voltage division resistor has a first terminal connected to the second terminal of said first voltage division resistor and a second terminal connected to said compensation resistor.

7. A constant voltage circuit comprising:

a transformer having a primary winding and a secondary winding;

a switching element that periodically interrupts a current flowing in said primary winding of said transformer at a duty ratio defined by a duration of time at which the current flowing therein is interrupted per one period;

a rectifier that rectifies a current induced in said secondary winding of said transformer;

a pair of output terminals having a first terminal and a second terminal, across which an output of said rectifier is developed;

a pair of voltage division resistors consisting of a first voltage division resistor and a second voltage division resistor connected across said first terminal and said second terminal, said pair of voltage division resistors voltage dividing a voltage developed thereacross and outputting a detection voltage;

a control circuit that controls the duty ratio so that the detection voltage helps maintain a constant output voltage to a load;

a resistor circuit connected between the first terminal and the load in a closed loop formed by connecting said pair of output terminals to the load, and a compensation resistor connected between the second terminal and the load wherein said compensation resistor has a resistance value that is a function of said resistor circuit and said pair of voltage division resistors.

8. The constant voltage circuit according to claim 7, wherein said first terminal of said pair of output terminals is higher in voltage than said second terminal of said pair of output terminals.

9. The constant voltage circuit according to claim 8, wherein said compensation resistor has a first terminal connected to the second terminal of said pair of output terminals and a second terminal connected to ground.

10. The constant voltage circuit according to claim 9, wherein the load has a first terminal connected to said resistor circuit and a second terminal connected to ground.

11. The constant voltage circuit according to claim 7, wherein said resistance value of said compensation resistor is determined so that a resistance ratio of said resistor circuit to said compensation resistor is equal to a resistance ratio of said first voltage division resistor to said second voltage division resistor.

12. The constant voltage circuit according to claim 11, wherein said first voltage division resistor has a first terminal connected to the first terminal of said pair of output terminals and a second terminals and wherein said second voltage division resistor has a first terminal connected to the second terminal of said first voltage division resistor and a second terminal connected to said compensation resistor.

13. A constant voltage/constant current changeover circuit comprising:

a constant current circuit including:
 a first transformer having a primary winding and a secondary winding;
 a first switching element that periodically interrupts a current flowing in said primary winding of said first transformer;
 a first rectifier that rectifies a current induced in said secondary winding of said first transformer; and
 a first pair of output terminals having a first terminal and a second terminal, across which a constant current is output;

a constant voltage circuit including:
 a second transformer having a primary winding and a secondary winding;
 a second switching element that periodically interrupts a current flowing in said primary winding of said second transformer;
 a second rectifier that rectifies a current induced in said secondary winding of said second transformer; and
 a second pair of output terminals having a first terminal and a second terminal, across which a constant voltage is output;

a connection line that connects the second terminal of said first pair of output terminals and the first terminal of said second pair of output terminals;

an output terminal that provides an output representative of both a signal on said first terminal of said first pair of output terminals and a signal on said second terminal of said second pair of output terminals;

a first resistor connected across said first terminal and said second terminal of said first pair of output terminals;

a second resistor and a third resistor serially connected across said first terminal and said second terminal of said second pair of output terminals;

a control circuit that selects either one of said first switching element and said second switching element to selectively operate only one of said constant current circuit and said constant voltage circuit, said control circuit controlling said first switching element and said second switching element so that a voltage at a node between said second resistor and said third resistor helps maintain a constant output voltage to a load; and a fourth resistor connected between said second terminal of said second pair of output terminals and the load wherein said fourth resistor has a resistance value that is a function of said first resistor, said second resistor, and said third resistor.

14. The constant voltage/constant current changeover circuit according to claim 13, wherein said first terminal of said first pair of output terminals is higher in voltage than said second terminal of said first pair of output terminals, and said first terminal of said second pair of output terminals is higher in voltage than said second terminal of said second pair of output terminals.

15. The constant voltage/constant current changeover circuit according to claim 14, wherein said fourth resistor has a first terminal connected to said second terminal of said second pair of output terminals and a second terminal connected to ground.

16. The constant voltage/constant current changeover circuit according to claim 15, wherein the load has a first terminal connected to said first terminal of said first pair of output terminals, and a second terminal connected to ground.

17. The constant voltage/constant current changeover circuit according to claim 13, wherein said resistance value of said fourth resistor is determined so that a resistance ratio of said first resistor to said fourth resistor is equal to a resistance ratio of said second resistor to said third resistor.

18. The constant voltage/constant current changeover circuit according to claim 17, wherein said second resistor has a first terminal connected to said first terminal of said second pair of output terminals and a second terminal, and wherein said third resistor has a first terminal connected to said second terminal of said second resistor and a second terminal connected to said fourth resistor.

19. The constant voltage/constant current changeover circuit according to claim 13, wherein said load comprises a photosensitive drum having a surface on which toner images are formed, and a transfer roller disposed in a confronting relation with said photosensitive drum with a recording medium therebetween.

20. The constant voltage/constant current changeover circuit according to claim 19, wherein said constant current circuit is operated when said photosensitive drum transfers the toner images onto the recording medium, and wherein said constant voltage circuit is operated when toner particles remaining on said transfer roller are cleaned.

* * * * *